United States Patent

[11] 3,573,476

| [72] | Inventors | Allan F. Falcoff; |
| | | James N. Guthrie, Seaford, Del. |
| [21] | Appl. No. | 777,310 |
| [22] | Filed | Nov. 20, 1968 |
| [45] | Patented | Apr. 6, 1971 |
| [73] | Assignee | E. I. duPont de Nemours and Company |
| | | Wilmington, Del. |

[54] APPARATUS FOR DETERMINING REFLECTIVE COLOR INDEX OF FIBROUS SAMPLES
7 Claims, 4 Drawing Figs.

| [52] | U.S. Cl. | 250/227, |
| | | 250/209, 350/96, 356/195 |
| [51] | Int. Cl. | G02b 5/16, |
| | | G01j 3/50 |
| [50] | Field of Search | 250/227, |
| | | 207, 226, 209; 350/96 (B); 356/173, 186, 188, 195 |

[56] References Cited
UNITED STATES PATENTS

| 2,774,276 | 12/1956 | Glasser et al. | 250/226X |
| 3,101,411 | 8/1963 | Richards | 250/227X |
| 3,155,831 | 11/1964 | Goodwin et al. | 250/207 |
| 3,305,689 | 2/1967 | Leavy, Jr. et al. | 250/227 |
| 3,455,637 | 7/1969 | Howard | 350/96 |
| 3,463,595 | 8/1969 | Blanc et al. | 250/227X |

*Primary Examiner*—Walter Stolwein
*Attorney*—Howard P. West, Jr.

ABSTRACT: An apparatus for uniformly illuminating a fiber sample in a colorimeter wherein a plurality of fiber optic light guides are arranged circumferentially around the sample. One end of each light guide is directed upwardly toward the sample and the other end of each light guide is positioned in the directed path of an illumination source to receive light therefrom. An auxiliary light guide directed toward the sample holder and coupled to the electrical measuring circuitry of the colorimeter senses the absence of a sample holder and deactivates the electrical components of the colorimeter.

PATENTED APR 6 1971

INVENTORS
ALLAN F. FALCOFF
JAMES N. GUTHRIE

BY *Howard P. West Jr.*
ATTORNEY

INVENTORS
ALLAN F. FALCOFF
JAMES N. GUTHRIE

BY *Howard P. West Jr.*
ATTORNEY

3,573,476

APPARATUS FOR DETERMINING REFLECTIVE COLOR INDEX OF FIBROUS SAMPLES

BACKGROUND OF THE INVENTION

This invention relates generally to colorimeters and particularly to improved apparatus for determining the reflective color index of fibrous and yarn samples. This color index is used to measure dyeability under controlled dyeing conditions and thereby to monitor one quality parameter of the fiber or yarn. More particularly, this invention concerns component apparatus for a colorimeter which provides illumination of a fibrous sample under test.

In the past, it has been customary to employ a colorimeter such as that disclosed by Glasser et al. in U.S. Pat. No. 2,774,276. Specimens of yarn or loose fiber having approximately a preselected weight were dyed under controlled conditions of dye concentration, temperature and time. They were then dried, and placed in a test holder having a transparent bottom. The specimens or samples were then pressed in the holder and the holder placed over the sample port of the colorimeter. In this colorimeter, a single beam of light was projected upward at 45° angle onto the bottom of the sample and photometric readings taken along the line perpendicular to the bottom surface of the sample holder. It was found that the reading taken for samples of this type depended upon the angle of orientation of the sample within the holder. Therefore, it was necessary to employ a means for rotating the sample holder during a color index determination in order to average readings over all angles of sample orientation within the holder. This was done by providing a ball bearing mounted base over the colorimeter sample port and a motor to rotate this base and sample holder at a speed sufficient to give an averaged color index determination. This technique was found to be time consuming, tended to give oscillating readings, showed lack of precision, and was difficult to adapt to automated test holder indexing for multiple samples.

Therefore, the object of this invention is to provide for improved uniform illumination of fibrous or yarn samples to overcome these difficulties.

SUMMARY OF THE INVENTION

The above object is accomplished in a colorimeter including a light source and in optical alignment therewith a light filter, a convergent lens and a semitransparent mirror directing the light from the convergent lens into first and second paths toward a reference color support and a removable sample color support respectively by an apparatus for uniformly illuminating the sample support with light from the second path. The apparatus comprises a ring positioned below the sample support and axially aligned therewith. The ring has cylindrical outer and inner surfaces with a plurality of passages connecting the outer and inner surfaces circumferentially spaced around the ring and oriented upwardly toward the sample support. One end of each of a plurality of optical fiber light guides is fastened into each passage and the other end of each guide is oriented axially in the second light path. Preferably the passages are equispaced around the circumference of the ring and are oriented perpendicular to the 45° conical inner surface of the ring.

The colorimeter also includes a pair of photodetectors, one viewing the sample and the other the reference, connected to circuit means for sensing electrical unbalance between the photodetectors. A further apparatus improvement comprises an auxiliary light guide having one end extended above the ring and directed toward the sample support and light-actuated circuit means connected to the sensing circuit means for deactivating the sensing circuit means. The other end of the light guide is coupled to the light-actuated circuit means and removal of the sample support will allow outside light conducted by the auxiliary light guide to inactivate the sensing circuit means.

DETAILED DESCRIPTION OF THE PREFERRED EMBODIMENT

Figure 1:
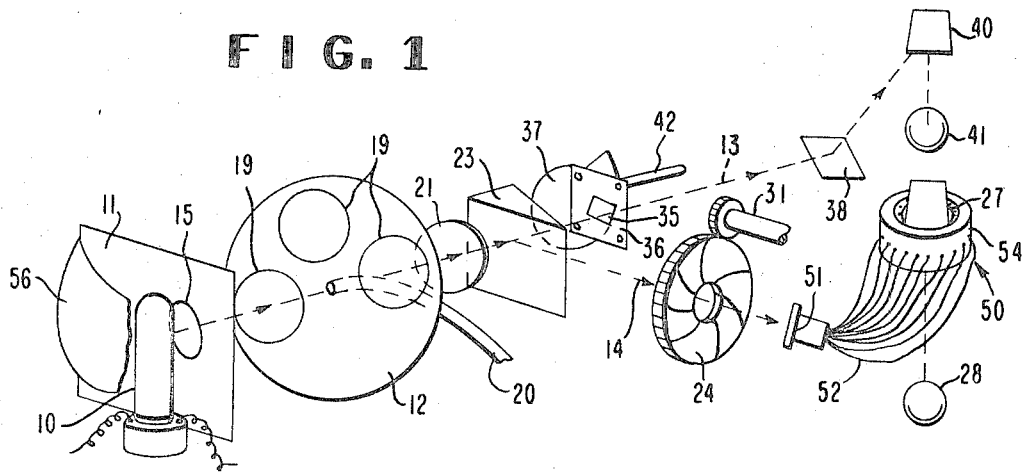
FIG. 1 is a diagrammatic perspective representation of the arrangement of optical elements generally according to U.S. Pat. No. 2,774,276 except for the addition of the modified sample illumination means of this invention.

The assembly of optical elements, as shown in FIG. 1, is essentially that as disclosed in U.S. Pat. No. 2,774,276. It includes a light source 10, wall 11 with aperture 15, color filter disc 12 with filters 19 attached thereto, a condensing lens 21, a beam splitter 23, mask 36 with aperture 35, light regulator 37 adjustable by shaft 42, mirror 38, color reference 40, reference photodetector 41, second light regulator 24 adjustable by shaft 31, and sample photodetector 28. Filters 19 are selectively interposed across the light beam by turning disc 12 with flexible control shaft 20. Beam splitter 23 is a semitransparent mirror employed to split entering light into two separate light paths, i.e., a first light path 13 and a second light path 14. The improved illuminator 50 of this invention includes a fixture 51 located adjacent light regulator 24 which contains the bunched input ends of the multiplicity of light guides 52. The input ends of the light guides are positioned by means of the location of fixture 51 in the second light path 14 so that each end may receive light therefrom. The output ends of guides 52 are fixed in illuminator ring 54, the structure of which is described in detail below. An additional modification to the basic colorimeter comprises a spherical mirror 56 located behind light source 10 in order to concentrate the illumination into the colorimeter.

Figure 2:
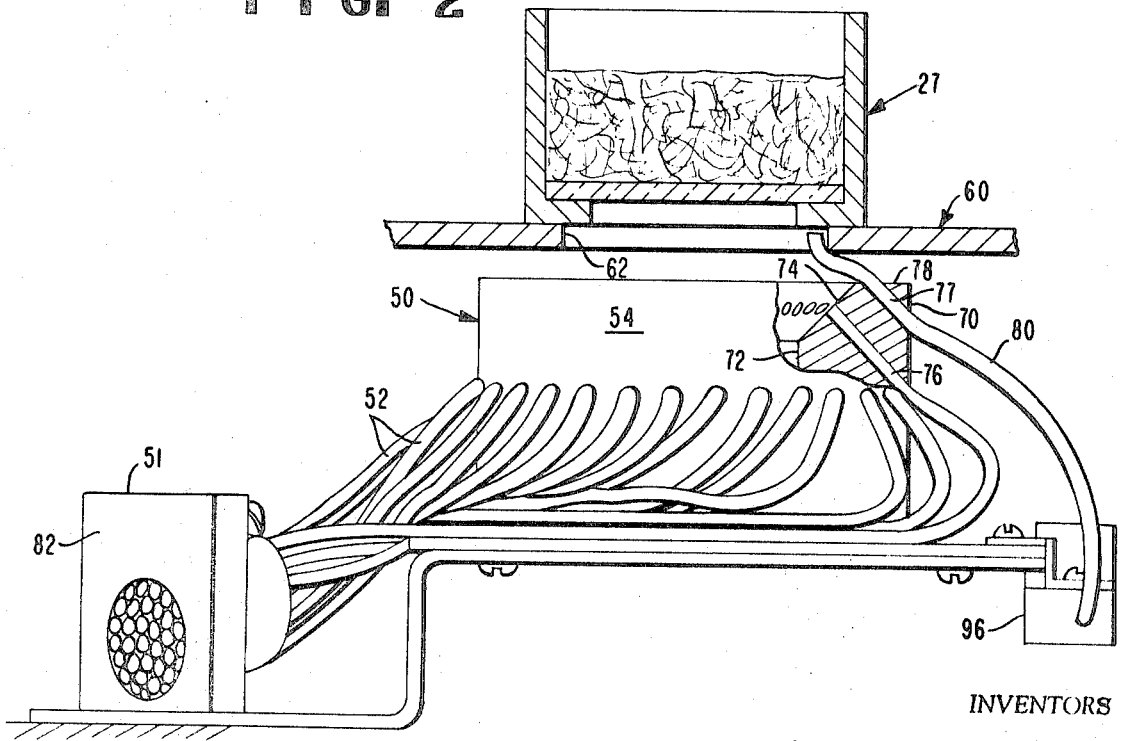
FIG. 2 is an elevation, partially in section of the illuminator of this invention showing its relationship to a sample holder containing a fibrous sample.

FIG. 2 shows the relationship of the illuminator 50 of this invention, when installed within a colorimeter 60, with respect to sample port 62 in the colorimeter and sample holder or support 27 positioned above port 62. The ring 54 of the illuminator 50 is mounted beneath port 62 so that the axis of the ring is coincident with the centerline of the port and the support 27 and is seen to have a cylindrical outer surface 70, a partial cylindrical inner surface 72 extending part way up from the bottom, and a 45° conical or tapered length 74 for the remainder of the ring height. A group of 30 passages 76 extend from surface 74 through ring 54 to surface 70 at an angle of 45° to the generatrix of surface 70 at the point of contact of each passage with the surface. Since surface 74 is part of a 45° cone, each passage 76 is perpendicular to surface 74. One additional passage 77 extends at an angle of 45° from the upper end surface 78 to the outer cylindrical side surface 70 of ring 54. Light guides 52 are inserted in each passage 76 until they extend to surface 74. Guides 52 are cemented in bores 76 and their output ends trimmed flush with surface 74, then ground and polished to form clear output ends for each of the light guides. The other ends of guides 52 are bunched together and cemented in fixture 51 with their ends extending to the outer surface 82 thereof. The input ends of guides 52 are then ground and polished clear and flush with the surface 82.

The light guides used in the preferred embodiment are Crofon*

---

Figure 3:
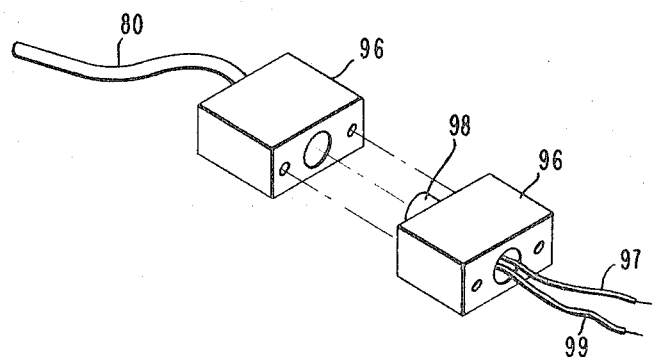
FIG. 3 is a broken away perspective view of the auxiliary light guide coupled to the photocell of the light-actuated circuit means.

*Registered duPont trademark.1610X which comprise a bundle of 64, 10 mil, polymethyl methacrylate fibers with each being coated for total internal reflection. An auxiliary light guide 80 is inserted through bore 77 to extend slightly above surface 78 at one end to such a length as to be flush with the outside colorimeter cabinet near the outside periphery of port 62. The other end of guide 80 is cemented in holder 96 which contains an auxiliary photocell 98 connected to leads 97, 99, (FIG. 3).

Figure 4:
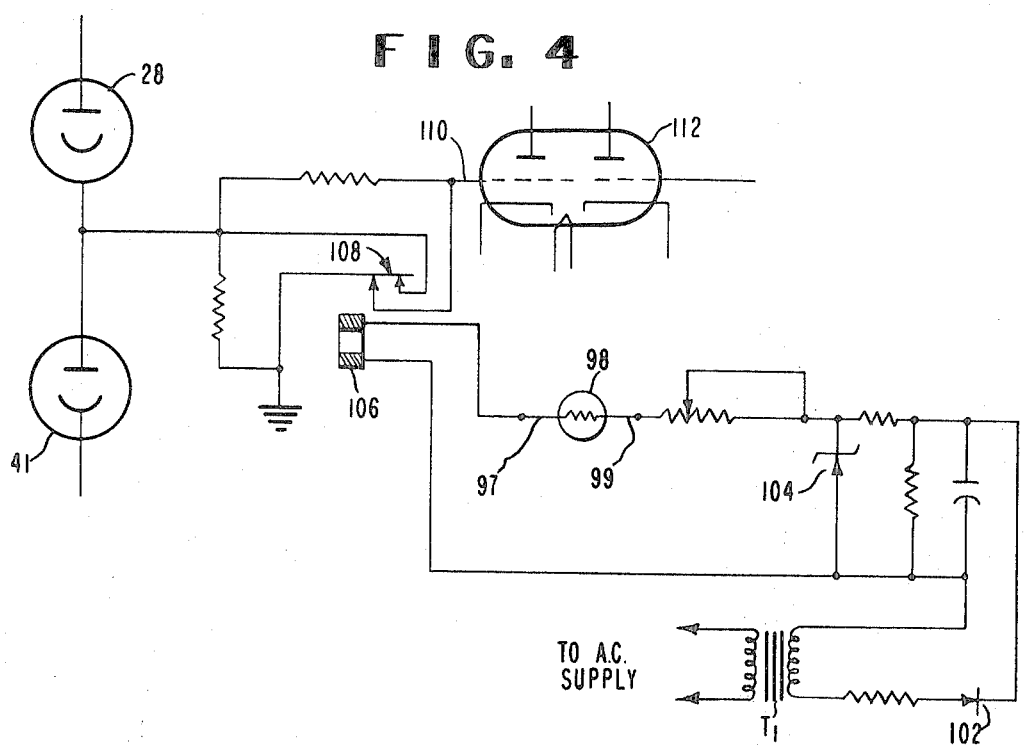
FIG. 4 is a partial schematic circuit diagram of colorimeter electronics with the deactivating circuit elements added.

FIG. 4 shows the way in which auxiliary photocell 98 is used in the electronic circuitry of a colorimeter. An AC supply is connected through transformer T1 and the rectifier circuit (including diode 102 and Zener 104 with associated resistors and capacitors) to photocell 98 and relay coil 106 in series. Two contacts 108 of relay 106 are connected in such a way that they connect the midpoint of the connection between photodetectors 28 and 41 to ground and at the same time connect the grid terminal 110 of amplifier tube 112, also to ground, whenever light falls on photocell 98. The upper end of auxiliary light guide 80 is arranged so that when a sample holder 27 of fiber for colorimetric measurements is placed over port 62, no outside light will fall on the upper end of auxiliary light guide 80. However, when no sample holder is in place over port 62, outside light will fall on the upper end of light guide 80 and be conducted down through the light guide and impressed on photocell 98, thus energizing relay coil 106 and grounding the circuitry as shown. In this manner the circuit means for sensing electrical unbalance between photocells 28, 41 is deactivated by light-actuated circuit means to protect the circuit elements when too much light falls on photocell 28, while at the same time allowing the amplifier to be maintained in the warmed-up state and, therefore, make possible more stable readings even when sample holders are removed and replaced during a series of colorimetric measurements.

In operation, illuminator 50 provides light from the sample light beam 14 of the colorimeter and distributes it around a full circle and projects it upward at an angle of 45° with the plane of a sample holder 27. It has been found that this arrangement eliminates the need for rotating samples during the measurement. The invention thereby provides improvement in precision and stability of measurement. In addition, it is contemplated that an array of a large number of equal size sample holders may be automatically indexed in two directions in the plane parallel to sample port 62 and programmed to provide automatic color measurements on a large number of samples.

It is apparent that many changes and modifications may be made in the disclosed apparatus without departing from the spirit of the present invention. For example, the double beam colorimeter illustrated may easily be replaced with a single beam colorimeter. Then it would be a simple design repetition to arrange a multiplicity of single beam colorimeters and illuminating rings in a group and scan their individual outputs by means of computer logic.

We claim:

1. In a colorimeter including a light source and optical means for directing light from the source into a path toward a color sample support, an apparatus for uniformly illuminating a randomly oriented fiber sample in said sample support comprising: a plurality of elongated optical light guides for directing light toward said support, said guides having opposite ends, one end of each guide being positioned below said support, said one ends being equispaced circumferentially around and equiangularly oriented upwardly toward the center of said support, at an angle of about 45° the other end of each guide being positioned in said path to receive light therefrom.

2. The apparatus as defined in claim 1 said optic light guides comprising polymethyl methocrylate fibers.

3. In a colorimeter including a light source and in optical alignment therewith a light filter, a convergent lens and a semitransparent mirror directing the light from said convergent lens into first and second paths toward a reference color support and a removable color sample support respectively, an apparatus for uniformly illuminating a randomly oriented fiber sample in said sample support with light from said second path said apparatus comprising:
   a. a ring positioned below said sample support and axially aligned therewith, said ring having cylindrical outer and inner surfaces, there being a plurality of passages connecting said outer and inner surfaces, said passages being equispaced circumferentially around said ring and angularly oriented upwardly toward said sample support at an angle of about 45°; and
   b. a plurality of optical light guides, for directing light toward said support, one end of each guide being fastened in a separate passage, the other end of each guide being positioned in said second path to receive light therefrom.

4. The apparatus as defined in claim 3, said optic light guides comprising polymethyl methacrylate fibers.

5. The apparatus as defined in claim 3, said inner surface having successive tapered and cylindrical lengths, said passages connecting said outer surface and said tapered length.

6. The apparatus as defined in claim 5, said one end of each guide being fastened in separate passages flush with said tapered length.

7. The apparatus as defined in claim 3 including the following additional elements; a pair of photodetectors, one viewing the sample and the other the reference, connected to circuit means for sensing electrical unbalance between the photocells; an auxiliary light guide having one end extended above said ring and directed toward said sample support; and light-actuated circuit means connected to said sensing circuit means, the other end of said auxiliary light guide being coupled to said light-actuated circuit means whereby removal of said sample support will allow outside light conducted by said auxiliary light guide to inactivate said sensing circuit means.